July 9, 1968 K. HERMANN ET AL 3,392,324

CONSTANT CURRENT CIRCUIT FOR DETERMINATION OF PRINTED CIRCUIT ACCEPTABILITY

Filed Dec. 29, 1965 2 Sheets-Sheet 1

INVENTORS
KARL HERMANN
WARREN R. WRENNER

BY John C. Black
ATTORNEY

United States Patent Office 3,392,324
Patented July 9, 1968

3,392,324

CONSTANT CURRENT CIRCUIT FOR DETERMINATION OF PRINTED CIRCUIT ACCEPTABILITY

Karl Hermann, Vestal, and Warren R. Wrenner, Endicott, N.Y., assignors to International Business Machines Corporation, Armonk, N.Y., a corporation of New York Filed Dec. 29, 1965, Ser. No. 517,333
12 Claims. (Cl. 323—4)

ABSTRACT OF THE DISCLOSURE

Power consumption in a constant current driver is minimized by means of a voltage regulator including parallel connected emitter follower transistor amplifiers connected in series with the driver and its variable resistance load. The impedance of the amplifiers is varied inversely with the load impedance. Thus in one application, thirty ampere current pulses can be applied to printed circuit board wiring patterns, with resistances varying from six-tenths ohm to one and eight-tenths ohms, for circuit continuity tests.

Figure 1A:
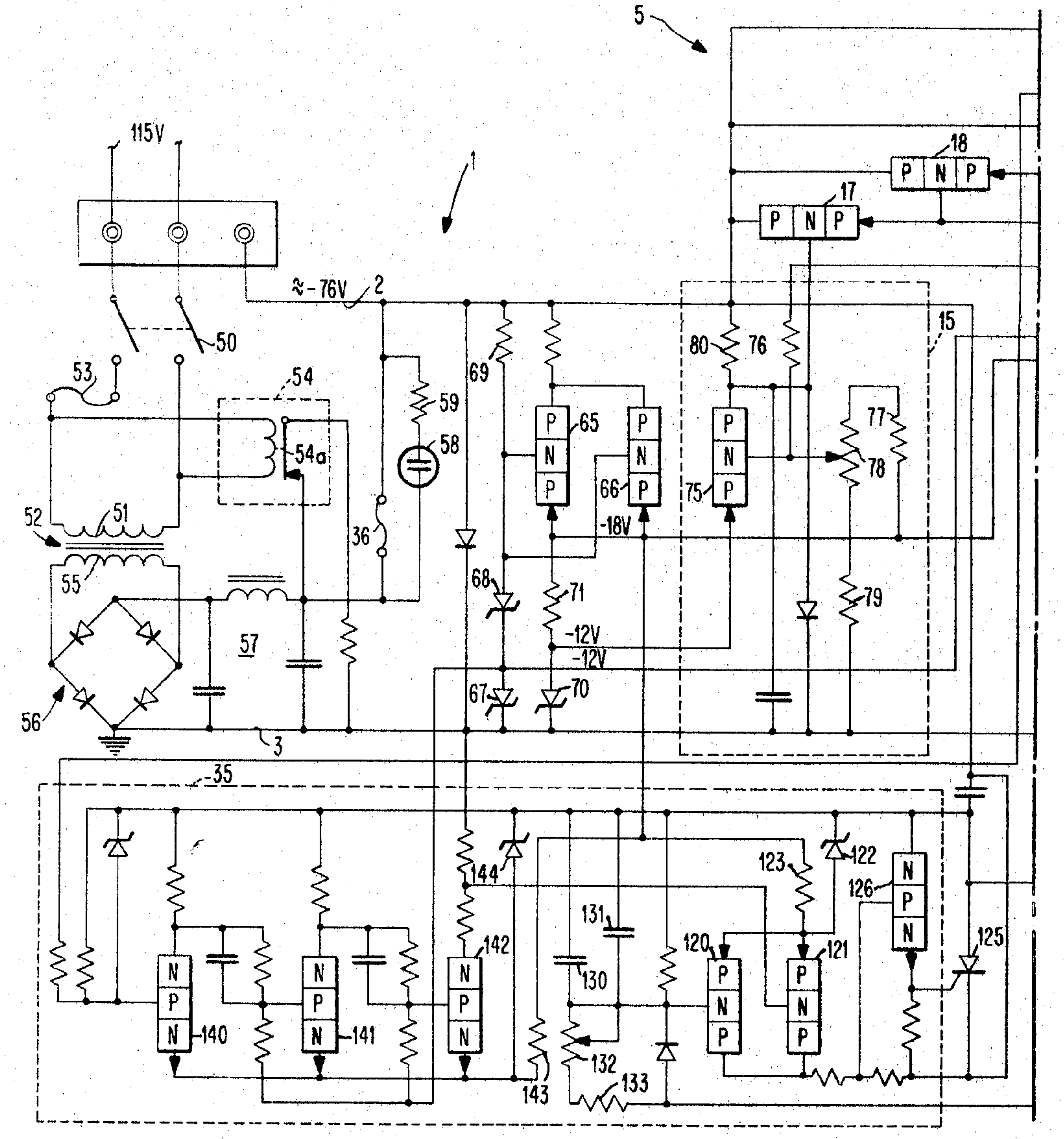

The present application relates to an improved means for producing a constant current through a variable load impedance.

The wiring pattern on printed circuit boards contains a multiplicity of individual paths or lines which vary in shape and length and therefore, vary in the total electrical resistance which they present between the ends thereof. With the advent of micro-miniaturization of electronic circuits which are attached to such boards for support and electrical interconnection, the cross sectional area has become extremely small. This small cross sectional area of the lines has given rise to rather severe manufacturing problems and the testing of all or a substantial number of the boards produced on a given production line becomes imperative.

The requirement for an unusually large number of tests has given rise to the need for high speed automatic testing, more frequently under computer control in order to maintain the cost of testing per board at an acceptable level.

When a printed circuit board is tested, the end terminals of each path are sequentially connected under machine control to the various test circuits, when the various tests are performed on each path, the next succeeding path is connected to the test circuits until all of the paths have been so connected.

When a path is connected to the test circuits, it is checked for an electrical continuity, usually at a relatively low current level; however, this continuity test does not determine the presence of reduced cross sectional areas, notches or voids of very short length along the path. These defects in the electrical path can cause severe maintenance and/or error problems in the electronic apparatus within which they are used. Hence their presence must be reliably determined.

One method for identifying such defects in the path is the application of a very high current pulse for a very short time duration to the path. This high current pulse causes a temperature increase along the path because of the power consumption in the metallic path. The temperature distribution along the path is an inverse function of the cross sectional area of the path, i.e. a reduced cross sectional area, notch or void increases the resistance of the incremental length of the path in which such defect occurs. These high resistance incremental lengths consume more power and develop higher temperatures than the other path portions. If this heat is not rapidly dissipated, the defective section will melt or possibly even vaporize the metal at that point.

In this regard it will be noted that the "burnout" of a notch, void or other defect by the high current will render the defect visually observable on the board. This will aid in the manual repair of the board, assuming that such repairs are economically feasible, as is the usual case in high quality boards utilized in computers. In addition, assuming that the test circuits are under computer control the location and nature of such errors will be identified in a print out made with respect to the defective board.

It will be appreciated, however, that the extent of the burnout described above should be minimized in order to prevent unnecessary damage to the wiring path and to the board. Means will be described below for minimizing this burnout.

The criteria for determining the acceptance of any path can therefore be based upon its ability to pass a high current pulse for a precise period of time. This requires a very accurately controlled constant current source.

The improved constant current source of the present application has been particularly designed for use in such a test vehicle; however, it will be appreciated that the present invention is not to be limited thereto, but can be used in many other applications.

Tests on typical printed circuit boards used in data processing apparatus have been successfully performed with thirty ampere current pulses of five milliseconds duration. It will be assumed that such pulses are developed with respect to the specific embodiment of the present application which will be described below. It will be appreciated that other suitable current levels and pulse durations may be used, depending upon the particular application.

The total resistance presented by any one path is extremely small, and the resistances of the various paths on a given board vary significantly, for example in one case from sixth-tenths ohm to one and eight-tenths ohms. A variety of constant current supplies which compensate for changes in load with a change in output potential are commercially available. Typically a power transistor switches the current on or off. However, the large output capacitance required in these known current sources limits their response time, thereby making them unsuitable in the present environment wherein rapidly changing load impedances are pulsed with an accurate high level current.

Another possible solution which comes to mind is the use of a voltage source and a constant current driver which comprises one or more transistors. The transistors are operated out of saturation in a common emitter configuration as a constant current driver by impressing a voltage across an emitter resistance. If the transistor or transistors are to function as a consant current source, they must present an internal impedance which is large when compared to the load which they drive. This is especially true if the load varies significantly while the current gain of the transistor or transistors remains relatively constant. However, practical limits are exceeded when high current levels are required because the power which must be dissipated across the transistor or transistors becomes excessive. For example, if a transistor current driver is operating at a minimum of one volt out of saturation, and the load varies between six-tenths ohm and one and eight-tenths ohms, then power in excess of one kilowatt must be dissipated across the transistor when the load is at its lowest value and is pulsed with a thirty ampere current level.

Transistor current drivers are not capable of handling such severe power requirements. Connecting several transistors in parallel to achieve sufficient power handling capability reduces the effective internal impedance of the current source and, therefore, is not practical.

However, if the voltage across the transistor current driver can be maintained constant, then the power demand on the current driver would be relatively small.

It is therefore a primary object of the present invention to provide a constant current drive means for a variable load impedance which includes means for maintaining a substantially constant voltage across a transistor constant current driver to minimize the power handling requirements of the driver.

This object is achieved in a preferred embodiment of the present invention by providing means for automatically increasing or decreasing the voltage applied across the constant current driver and the variable load impedance so that the voltage across the driver itself remains substantially constant. This means includes a power supply which furnishes a nominal direct current voltage level at its output. This voltage is coupled to the series connected current driver and variable load impedance by way of a series voltage regulator. The voltage regulator includes a plurality of parallel connected transistors interposed between one terminal of the power supply and the load impedance. A differential amplifier compares the voltage level at the junction between the constant current driver and the load impedance with a reference voltage and applies a control signal to the parallel connected regulator transistors to produce at their ouput a voltage level which equals the desired constant current driver voltage plus the voltage drop across the load impedance. Thus as the resistance of the load impedance increases or decreases, the voltage at the output of the parallel connected regulator transistors increases or decreases proportionately to compensate for said impedance change.

Since the power consumption in the constant current driver is minimized, the number of transistors which must be provided for the driver is maintained at a minimum. Also, a desired feature of a good voltage source is a low output impedance, consequently, the paralleling of a large number of transistors in the series regulator is particularly advantageous in the improved circuit. The constant current driver defines the current pulse amplitude more precisely than previously possible and compensates for any drift in the voltage regulator.

It is therefore a more specific object of the present invention to provide an improved constant current drive means for a variable load impedance characterized by a constant current driver and a voltage regulator which maintains the voltage across the driver substantially constant.

The foregoing and other objects, features and advantages of the invention will be apparent from the following more particular description of a preferred embodiment of the invention, as illustrated in the accompanying drawings.

Figure 1B:
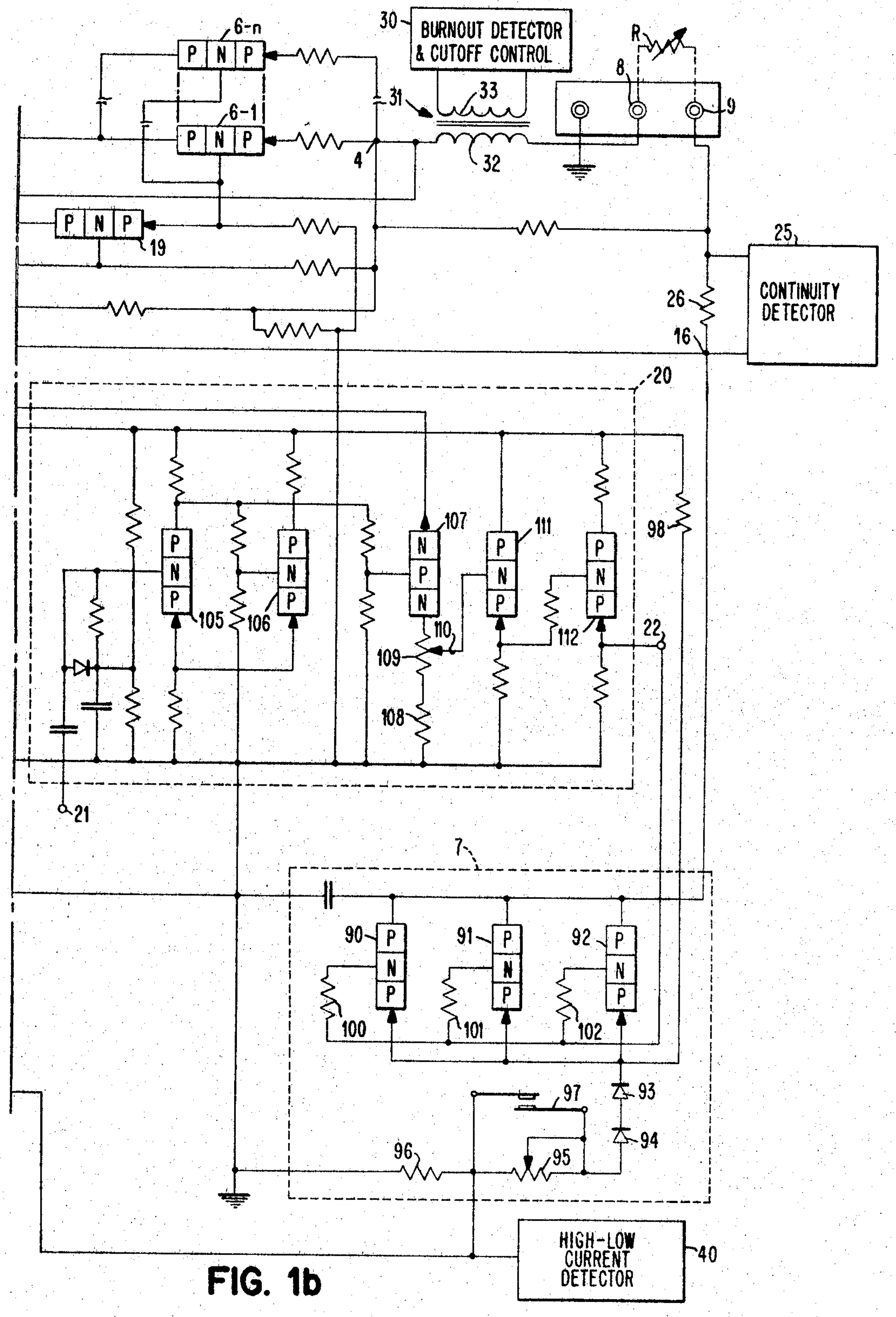

In the drawings:

FIGS. 1*a* and 1*b* are schematic diagrams of a preferred embodiment of a constant current drive means embodying the teachings of the present invention.

The improved circuit of FIGS. 1*a* and 1*b* includes a power supply 1 which furnishes a nominal direct current voltage across its output conductors 2 and 3. The conductor 3 is grounded and the conductor 2 is at a negative potential with respect to ground. A voltage regulator 5 includes a plurality of parallel connected transistors 6–*l* to 6–*n* coupling the conductor 2 to one end of a load impedance R. The output terminal 4 of the transistors 6–*l* to 6–*n* will be set at various potential levels depending upon the value of the load impedance R.

A constant current driver 7 couples the conductor 3 to the other end of the impedance R. As indicated above, the impedance R represents a large number of individual current paths on a printed circuit board, each of which is selectively connected to terminals 8 and 9 by relay trees (not shown) preferably under the control of a computer (not shown). Since each path varies in length (and cross sectional area), the impedance R is shown as a variable resistance.

The voltage regulator 5 further includes an amplifier 15 which compares the voltage at the output terminal 16 of the constant current driver with a reference voltage and applies an output control signal to the regulator transistors 6–*l* to 6–*n* by way of current amplifiers 17, 18 and 19.

A trigger 20 responds to input pulses at the terminal 21 to produce substantially square wave output pulses at the terminal 22 for turning the driver 7 on for a predetermined time interval with very short rise and fall times in the driver output current.

Various safety and test circuits are illustrated diagrammatically. Thus a continuity detector circuit 25 is coupled to a resistor 26. The resistor 26 is interposed between the load impedance R and the constant current driver 7. When the current flowing through the resistor 26 exceeds a predetermined low value indicative of continuity in the particular printed circuit path represented by R, the detector 27 responds in a well known manner to produce an output signal representative of such continuity.

A burnout detector and cutoff control circuit 30 is provided to prevent damage to the printed wiring path and its supporting board in the event that a burnout occurs as a result of the detection of a notch, void or abnormally small cross sectional area in the path being tested. The purpose of the circuit 30 is to signal at the instant burnout occurs the decision logic which will terminate the input pulse to the trigger 20 and its associated constant current driver 7, thereby preventing irreparable damage to the wiring path and the board.

The circuit 30 is of conventional construction and responds to an input pulse of predetermined polarity received by way of a transformer 31. The primary winding 32 of the transformer is interposed between the terminal 8 and the transistors 6–*l* to 6–*n*. When a line burnout occurs, current flow in the primary winding 32 is interrupted and induces a voltage spike in the secondary winding 33. This voltage spike actuates the circuit 30 to terminate the input pulse to the trigger 20. If the circuit 30 were not provided, the voltage regulator would sense the burnout as an increased load and automatically increase its output voltage in an attempt to maintain the desired current level. It is this increased power which could severely damage the board.

An emergency shutoff circuit 35 is provided to prevent a catastrophic failure in the event that the high current pulse from the driver 7 continues to flow beyond the predetermined pulse time, or alternatively, a short develops, for example, at the terminal 8. The circuit 35 responds to either of these conditions to cause a fuse 36 in the power supply 1 to fail, thereby shutting off the power to the circuits set forth in the drawings. The response time of the circuit 35 and the failure of the fuse 36 are selected so that power is shut down before the contacts of the tree relays open. If the contacts were to open with the thirty ampere current flowing through the circuit, they would be severely damaged or destroyed. The details of the circuit 35 will be described later.

A high-low current detector circuit 40 is connected to the driver 7. This circuit is of conventional construction and includes threshold detecting circuits which determine whether the high current level is maintained within predetermined limits. For example, the circuit 40 can include two detectors, one of which detects the presence of a current level in excess of twenty-nine amperes and the other of which detects the presence of a current level greater than thirty-one amperes. A satisfactory current level is therefore indicated by the lower level detector being rendered effective and the higher level detector being rendered ineffective.

The details of the various circuits will now be set forth more fully. The power supply 1 includes a switch 50 which connects the primary winding 51 of a transformer 52 to an alternating current supply by way of a fuse 53 and a relay 54. The secondary winding 55 of the transformer is connected to a full wave rectifier 56 and a filter 57. The output of the filter is connected to the line 3 and is further connected to the line 2 by way of the fuse 36, a neon tube 58 and resistor 59. In the event that the fuse 36 fails as described above, the power supply will be connected across the neon tube 58 and the resistor 59 to produce a very low voltage at the line 2. The relay 54 includes contacts 54*a* which when the switch 50 is open, discharge the capacitors in the filter 57.

The power supply 1 includes means for setting various direct current voltage levels (e.g. negative twelve volts and negative eighteen volts) for biasing and operating potentials for the various circuits disclosed. This means includes an emitter follower circuit comprising a pair of transistors 65 and 66 connected in parallel. The base electrodes of the transistors 65 and 66 are connected to a fixed bias means comprising a pair of series connected Zener diodes 67 and 68 and a resistor 69. In the preferred embodiment the diode 67 defines a twelve volt drop and the diode 68 a six and eight-tenths volt drop to set the potential at the base electrodes at a negative eighteen and eight-tenths volts. The potential at the emitter electrodes of the transistors will therefore be approximately at a negative eighteen volt potential.

A Zener diode 70 which defines a twelve volt drop is connected to the emitter electrodes of the transistors 65 and 66 by way of an emitter resistor 71. This latter diode defines the reference potential which is compared with the output potential of the driver 7 at the terminal 16 by the amplifier 15.

The amplifier 15 includes a common emitter transistor amplifier 75 having its emitter electrode connected to the diode 70 and having its base electrode connected to the junction 16 by way of a current limiting resistor 76. The base electrode is also connected to a biasing voltage divider comprising resistors 77, 78 and 79 which are connected in series between ground potential and the negative potential at the emitter electrodes of the transistors 65 and 66. The collector electrode of the transistor 75 is returned to the negative supply line 2 by way of a resistor 80. The collector electrode is also connected to the base electrode of the first current amplifier 17.

The amplifier 75 is normally biased near saturation and it functions to supply a voltage sufficient in magnitude to allow the selected pulse current level to flow through the load R and to maintain the desired voltage across the driver 7. When the driver is pulsed on and current flows through the load R, the base of the amplifier 75 is driven in such a manner that its collector potential instantly rises to satisfy the condition, whereby the output potential of the regulator 5 equals the desired driver voltage plus the desired voltage drop across the load R at the preselected current level. The output current of the amplifier 75 is insufficient in magnitude to maintain a substantial load current through the series control transistors 6–*l* to 6–*n* which may comprise as many as thirty-five transistors. The required current drive is therefore provided by the current amplifiers 17, 18 and 19 which provide the necessary gain for proper control. In the preferred embodiment, the amplifier stages 17, 18 and 19 and the series control stages 6–*l* to 6–*n* are preferably provided with a voltage gain approximating unity. Therefore, the voltage output of the regulator 5 is essentially equal to the voltage output at the collector electrode of the transistor amplifier 75.

The driver 7 of the preferred embodiment comprises three parallel connected common emitter constant current transistor drivers 90, 91 and 92. The collector electrodes of the latter transistors are connected to the load R by way of the resistor 26 and their emitter electrodes are connected to ground potential by way of a series circuit including diodes 93 and 94, a potentiometer 95 and a resistor 96. A pair of relay contacts 97 are connected across the potentiometer 95 and are closed when the high current level (thirty amperes) is applied to the load R and are open when the low current level (five amperes) is applied to the load R. The emitter electrodes are also connected to the negative eighteen volt bias level supply by way of a resistor 98. The base electrodes of the driver transistors are connected to the output terminal 22 of the trigger 20 by way of current limiting resistors 100, 101 and 102.

The trigger 20 includes a first pair of transistors 105 and 106 connected in the form of a Schmitt trigger which is normally biased to one stable state with the transistor 105 nonconducting and the transistor 106 conducting. A negative input pulse at the terminal 21 will switch the transistor 105 on and the transistor 106 off. The positive going potential at the collector electrode of the transistor 105 will switch an inverting transistor amplifier 107 on. The collector electrode of the amplifier 107 includes an adjustable level setting voltage divider comprising a resistor 108 and a potentiometer 109. The potentiometer is adjusted to a position which will cause the driver 7 to produce the desired output current level. The movable contact 110 of the potentiometer 109 is coupled to the base electrodes of the driver transistors 90, 91 and 92 by way of a pair of emitter followers 111 and 112.

The emergency shutoff circuit 35 includes a pair of parallel connected transistor amplifiers 120 and 121 connected in a common emitter configuration. The emitter electrodes of the latter transistors are set at a selected level by means of a Zener diode 122 and a resistor 123. The collector electrodes of the transistors 120 and 121 are coupled to the control electrode of a silicon-controlled rectifier 125 by way of an emitter follower 126. If either transistor 120 or 121 is turned on, the rectifier 125 will be turned on to short circuit the power supply lines 2 and 3. This will in turn cause the fuse 36 to fail.

The transistors 120 and 121 are normally maintained in their nonconducting states. The base electrode of the transistor 120 is connected to an integrating circuit comprising capacitors 130 and 131, an adjustable potentiometer 132 and a resistor 133. The resistor 133 is connected to the junction between the emitter resistors 95 and 96 of the current driver 7. When the driver 7 is energized, the voltage at the junction between the resistors 95 and 96 is a function of the current output of the driver. The voltage pulse is integrated by the network described above and if the pulse duration is too long, the voltage at the base electrode of the transistor 120 reaches a value (preselected by the setting of the potentiometer 132) which turns the transistor on and fires the silicon-controlled rectifier 125. In the preferred embodiment the integrator circuit checks the duration of only the high current (thirty amperes) pulse. It will be appreciated that a similar integrating circuit and amplifier can be provided for checking the time duration of the low current pulse.

The base electrode of the transistor amplifier 121 is coupled to a circuit means which monitors the potential level at the output terminal 4 of the voltage regulator 5. This means includes three transistor amplifiers 140, 141 and 142 having their emitter electrodes connected to the negative eighteen volt supply by way of a common resistor 143. A Zener diode 144 sets the emitter electrodes at a negative six volt potential. The amplifiers are biased so that under normal operating conditions the transistor amplifier 141 is conducting and the amplifiers 140 and 142 are nonconducting. With the amplifier 142 in its nonconducting state, ground potential is applied to the base electrode of the transistor amplifier 121 maintaining the latter transistor off.

In the event that the voltage at the output terminal 4 of the voltage regulator rises toward ground, for example, if the terminal 8 becomes short-circuited to ground potential, the voltage at the base electrode of the transistor amplifier 140 rises sufficiently to switch the latter transistor on and the transistor amplifier 141 off. When the transistor amplifier 141 turns off, the amplifier 142 turns on to apply a more negative potential to the base electrode of the transistor amplifier 121 to turn the latter on. This causes the silicon-controlled rectifier 125 to be switched to its conducting state to short circuit the power lines 2 and 3 and initiate failure of the fuse 36.

The operation of the circuits in the preferred environment will now be described briefly. As indicated above, it will be assumed that the circuits are utilized in test equipment which is computer controlled. The switch 50 will be closed prior to the initiation of test operations to energize the circuitry to its normal operating condition. A first printed circuit board path will have its end terminals coupled to the terminals 8 and 9 by way of a multiplicity of relay contacts. After closure of all of the relay contacts is assured, a negative pulse will be applied to the trigger terminal 21 to cause a square wave output pulse to be applied to the transistors of the constant current driver 7, that is, the negative pulse at the terminal 21 switches the Schmitt trigger transistors 105 and 106 to their opposite states.

Transistor 105 turns on, causing transistor 107 to turn on. The voltage at the movable contact 110 goes more negative. This negative potential is applied by emitter followers 111 and 112 to the base electrodes of the driver transistors 90–92 to turn on the latter transistors. At this time the relay contacts 97 will be closed, whereby the driver transistors will produce a thirty ampere output pulse of predetermined time duration. This pulse will be applied to the printed circuit path illustrated by the load R over a path extending from the grounded supply line 3, resistor 96, contacts 97, diodes 94 and 93, the emitter-collector circuits of the transistors 90, 91 and 92, the resistor 26, terminals 9 and 8, the primary winding 32 of the transformer 31, the series controlled transistors **6–*l* to 6–*n* (and to a minor extent the current gain amplifiers 17 and 18) to the negative supply line 2**.

The amplifier 15 will instantly sense the voltage level at the junction 16 which is a function of the value of the load impedance R and instantaneously set the output terminal 4 of the regulator 5 at a level which sets the potential across the driver 7 to the desired value.

More specifically, the design and operating point of the amplifier 15 is such that the transistor 75 rapidly tracks the voltage level at the terminal 16 to establish at its collector electrode a voltage substantially equal to the sum of the desired voltage drops across the driver transistors 90–92 and the load R at the selected drive current level. Since a unity voltage gain is provided by the amplifier stages 17–19 and the series control stages **6–*l* to 6–*n*, a voltage equal to the collector voltage of the transistor 75 is provided at the output terminal 4 of the regulator 5**.

When the value of the load R is relatively low, the voltage at the terminal 16 would tend to go more negative, causing greater current flow in the transistor 75. The voltage drop across the resistor 80 increases causing the voltage at the collector of the transistor 75 to be less negative. This less negative voltage appears at the terminal 4 tending to maintain a constant voltage (at terminal 16) across the driver 7.

Alternatively, a larger value of load R tends to decrease the voltage at terminal 16 causing less current flow in transistor 75 and a more negative potential at its collector electrode. The potential at terminal 4 becomes more negative tending to maintain a constant voltage across the driver 7.

Assuming burnout does not occur, the input pulse at the terminal 21 will be terminated after five milliseconds to turn off the driver 7. Shortly thereafter the relays will be de-energized to disconnect the printed wiring path from the terminals 8 and 9. This sequence of operations will be repeated for each circuit path which is tested. Certain of the component values are set forth below because of their unusually low value. The resistor 26 is preferably in the order of three-hundredths ohm. The potentiometer 95 is set to have a value in the order of two ohms and the resistor 96 is in the order of two-tenths ohm. As indicated above, the transistor amplifiers **6–*l* to 6–*n*** must exhibit extremely small impedances to the current flowing therethrough; as a result of which their emitter resistors must have extremely low values for example, one ohm.

Boards which have been manually repaired are preferably tested at a lower current (e.g. five amperes) level. The lower current output is produced in the driver 7 by opening contacts 97. The operation of the test circuit is otherwise similar to that described above for the high current pulse.

It will be appreciated that although the circuits described above have been particularly adapted for a test environment, they are also useful in other constant current supply environments. For example, they can be readily adapted to high speed terminal welding, or for that matter, to manually controlled welding machines. Also continuous rather than pulsed currents can be delivered by the driver 7.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a circuit of the type in which an electrical load presents an impedance, the value of which varies significantly, and in which a source of energizing potential and an electronic constant current generator are controlled to supply a constant current to the load irrespective of its value;

the combination with the source and the generator of a voltage regulator means for maintaining the voltage drop across the generator substantially constant irrespective of the value of the load comprising a variable impedance means connected in series with the load and the generator, and means for controlling the valve of the variable impedance as an inverse function of the value of the load impedance.

2. In a circuit of the type in which an electrical load presents an impedance, the value of which varies significantly, and in which a source of energizing potential and an electronic constant current generator are controlled to supply a constant current to the load irrespective of its value;

the combination with the source and the generator of a voltage regulator means for maintaining the voltage drop across the generator substantially constant irrespective of changes in the value of the load, said regulator means comprising a plurality of parallel connected emitter follower transistor amplifiers connected in series with the load and the generator, and means for operating the amplifiers so that the value of their effective impedance varies as an inverse function of the value of the load impedance.

3. The combination set forth in claim 2 wherein the current generator comprises a plurality of parallel connected common emitter transistor amplifiers connected in series with the load and the regulator amplifiers, and means for operating the common emitter amplifiers at a selected output current level.

4. The combination set forth in claim 3 wherein the last-mentioned means comprises a trigger circuit for operating the common emitter amplifiers so as to produce constant current output pulses of predetermined time duration.

5. An electronic circuit comprising a source of direct current potential, including at least two terminals;

a variable load impedance;

an electronic constant current means connecting one end of the load impedance to one of said terminals; and a voltage regulator means including at least one electronic element connecting the other end of the load impedance to the other terminal and including means for controlling the impedance of the electronic element to maintain a substantially constant voltage drop across the constant current means irrespective of the value of the load impedance.

6. The combination set forth in claim 5 wherein the constant current means comprises at least one common emitter transistor amplifier having its emitter-collector electrodes connected between said one end of the load impedance and said one terminal.

7. The combination set forth in claim 6 together with a trigger means for applying input pulses of predetermined value for a selected time duration to the transistor amplifier to cause the latter to produce constant current output pulses.

8. The combination set forth in claim 5 wherein the constant means includes a plurality of parallel-connected common emitter transistor amplifiers connecting said one end of the load impedance to said one terminal, and wherein the regulator means includes a plurality of parallel-connected electronic elements connecting said other end of the load impedance to said other terminal.

9. The combination set forth in claim 8 wherein the means for controlling the impedance of the electronic elements comprises a differential amplifier comparing the voltage at the junction between the common emitter amplifiers and the load impedance with a reference voltage and producing an output signal which is a function of said comparison, and a current gain amplifier responsive to the latter output signal for controlling the impedance of the electronic elements.

10. In test apparatus of the type in which the end terminals of conductive paths on a printed circuit wiring board are sequentially connected to test circuits for determining the acceptability thereof, the combination comprising a source of direct current potential including at least two terminals, a plurality of parallel-connected common emitter transistor amplifiers for connecting one end of a connected conductive path to one of said terminals, means for operating the amplifiers as a source of constant current pulses of a predetermined short time duration, and a voltage regulator including a plurality of parallel-connected transistor amplifiers for connecting the other end of a connected conductive path to the other of said terminals and including means for controlling the impedance of the latter amplifiers to maintain a constant voltage drop across the common emitter transistor amplifiers.

11. The combination set forth in claim 10 together with means for initiating the termination of the constant current pulse in the event that the pulse causes a burnout in the conductive path.

12. The combination set forth in claim 10 together with means for rendering the apparatus ineffective in the event that the constant current pulse is maintained for a period in excess of said predetermined short time duration.

References Cited

UNITED STATES PATENTS

| | | | |
|---|---|---|---|
| 3,114,872 | 12/1963 | Allard | 323—4 |
| 3,317,817 | 5/1967 | Gershen | 323—4 |

OTHER REFERENCES

Ottesen: "Precision Current Source Independent of Supply Voltage," IBM Technical Disclosure Bulletin, vol. 7, No. 10, March 1965, p. 874.

LEE T. HIX, *Primary Examiner.*

A. D. PELLINEN, *Assistant Examiner.*